J. H. ARCHER.
DRAWING OFF TALLOW, LARD, &c., FROM PRESSURE TANKS.
No. 103,823. Patented June 7, 1870.
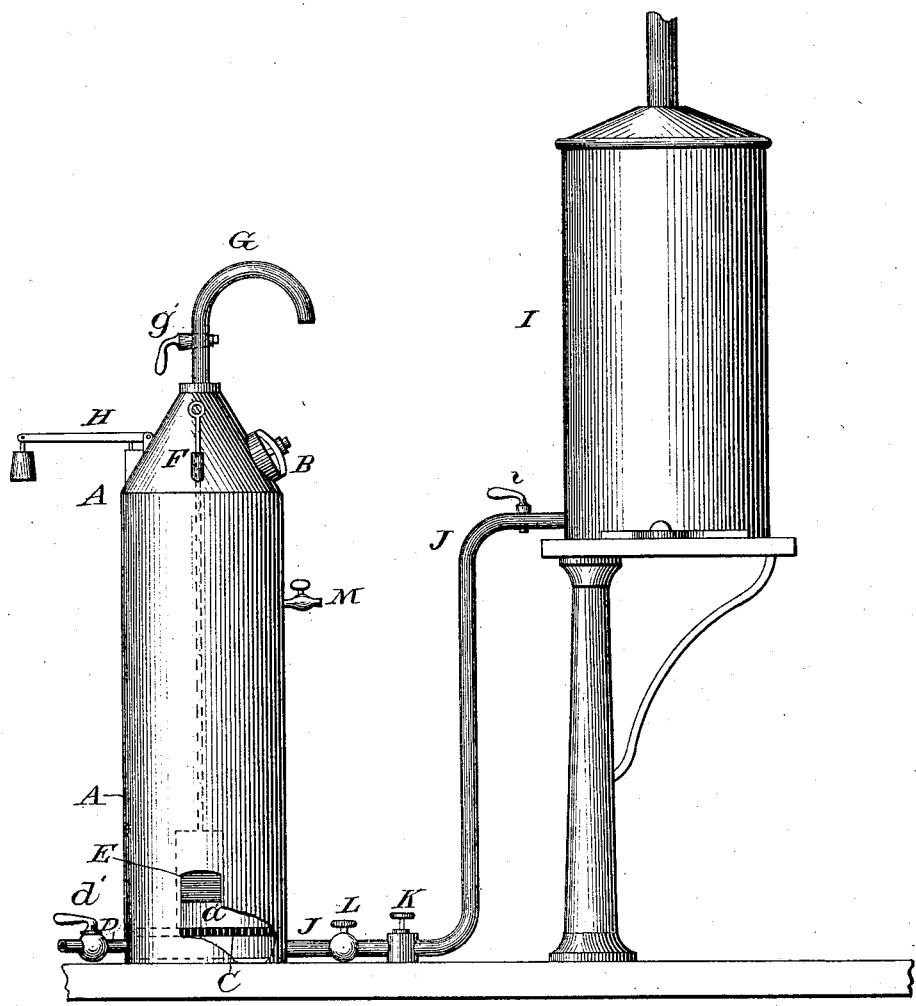

United States Patent Office.

JOHN H. ARCHER, OF BEAUMONT, TEXAS.

Letters Patent No. 103,823, dated June 7, 1870.

IMPROVEMENT IN DRAWING OFF TALLOW, LARD, &c., FROM RENDERING-TANKS.

The Schedule referred to in these Letters Patent and making part of the same.

*To all whom it may concern:*

Be it known that I, JOHN H. ARCHER, of Beaumont, county of Jefferson and State of Texas, have invented a new and useful Improvement in Drawing Off Tallow, Lard, &c., from Pressure-Tanks; and I do hereby declare that the following is a full, clear, and exact description thereof, which will enable others skilled in the art to make and use the same, reference being had to the accompanying drawing forming part of this specification.

The figure is a side view of my improved apparatus, part being broken away to show the construction.

My invention has for its object to furnish an improved method for drawing off tallow, lard, &c., from the rendering or pressure-tanks, by means of which the time and labor required for removing the tallow, lard, &c., will be greatly lessened, by which the tallow, &c., will be all drawn from the tank, and will be free from dirt and water, thus requiring no manipulation to free it from water; and It consists in removing the tallow, lard, oil, or other fatty matter, from the rendering or pressure-tank by the introduction of water, as hereinafter more fully described.

A represents the rendering-tank, which is built of any desired size, and of any suitable material, that will resist the pressure of the steam.

The meat and other material to be "tried" or rendered out is introduced through the man-hole B, and rests upon the false bottom C, which is perforated with numerous holes, and is placed a little above the bottom of the tank.

The steam is introduced into the tank A, beneath the false or perforated bottom C, through the steam-pipe D, which is provided with a stop-cock, *d'*, in the ordinary manner.

*a'* is an opening in the lower part of the side of the tank A, for convenience in removing the "scraps," &c., after the tallow, lard, &c., has been removed.

The opening *a'* is closed by a slide, E, placed within the tank A, and operated by a rod, F, passing out through a stuffing-box in the top of the tank, as shown in the figure.

The top of the tank A is made conical, and from its apex projects a bent or goose-neck pipe, G, which is provided with a stop-cock, *g'*, as shown.

The top of the tank A is also provided with a safety-valve, H, to guard against explosion from the too great pressure of the steam.

I is a cistern or water-reservoir placed at a higher level than the tank A, to give a head for forcing the water into the said tank A.

The reservoir I is connected with the tank A by the pipe J, which is provided with a stop-cock, K, and with a check-valve, L, to prevent any possible back-flow of the water.

When the pipe J is made detachable, the part that remains permanently connected with the reservoir I should be provided with a stop-cock, *i'*.

M is a gauge or try-cock placed in the upper part of the side of the tank A, for ascertaining the position of the steam, tallow, or water, as the case may be.

The cistern I may be kept filled with water by the action of the force-pump, or, if desired, the water may be forced directly into the tank A by a force-pump, or in any other convenient manner.

In using this method, the material to be tried or rendered is introduced into the tank through the man-hole, and the steam is introduced and operates upon the material in the ordinary manner.

When the lard, tallow, &c., are fully separated from the refuse, the steam is shut off and water is introduced, preferably, into the lower part of the tank A.

As the water rises in the tank, the lard, tallow, &c., being lighter, or of a less specific gravity than water, float upon its surface, and are forced up into the upper part of the tank A.

The stop-cock *g'* of the bent pipe G is then opened and the oil, lard, tallow, &c., flow out into the receiving-vessel, whence they are conducted by spouts, pipes, or other convenient means, to the place where they are to be cooled.

I prefer to receive the tallow, lard, &c., from the bent pipe G in an open receiver, as it enables the operator to see the exact moment when the oil ceases and the water begins to flow, so that he can shut off the water and thus prevent its outflow through said bent pipe.

The lard, tallow, &c., forced out by means of water, in accordance with my improved method, require no manipulation to free them from water, are entirely free from dirt, and cool much quicker than when drawn off in the old manner, thus producing an article of much better quality, besides saving from fifteen to twenty per cent., which was unavoidably lost when the old method was used.

Having thus described my invention,

I claim as new and desire to secure by Letters Patent—

The combination of the bent or goose-neck pipe G, provided with a stop-cock, *g'*, and the water-pipe J, provided with a stop-cock, K, and check-valve L, with the rendering or pressure-tank A, provided with its ordinary attachments, substantially as herein shown and described and for the purpose set forth.

JOHN H. ARCHER.

Witnesses:
J. B. LIKING,
T. F. HERRING.